United States Patent [19]
Grimnes

[11] Patent Number: 5,344,687
[45] Date of Patent: Sep. 6, 1994

[54] STRUCTURALLY REINFORCED THERMOPLASTIC-FABRIC COMPOSITE CONSTRUCTION MATERIALS THAT ARE MOLDABLE

[75] Inventor: Martin S. Grimnes, Brunswick, Me.

[73] Assignee: Brunswick Technologies, Inc., Brunswick, Me.

[21] Appl. No.: 766,516

[22] Filed: Sep. 27, 1991

[51] Int. Cl.$^5$ .............................................. B32B 3/06
[52] U.S. Cl. ...................... 428/102; 66/190; 66/202; 112/420; 428/246; 428/283; 428/902
[58] Field of Search ............ 428/102, 284, 902, 408, 428/283, 246; 112/420; 66/190, 202

[56] References Cited
U.S. PATENT DOCUMENTS

| | | | |
|---|---|---|---|
| 4,445,951 | 5/1984 | Lind et al. | 156/93 |
| 4,675,226 | 6/1987 | Ott | 428/102 |
| 4,704,321 | 11/1987 | Zafiroglu | 428/230 |
| 4,786,541 | 11/1988 | Nishimura et al. | 428/102 |

Primary Examiner—James J. Bell
Attorney, Agent, or Firm—Fish & Richardson

[57] ABSTRACT

Binded and structurally reinforced thermoplastic-fabric composite construction materials, that are moldable, are described, comprising a structurally reinforced multilayer binded together in a binding process. A barrier fabric layer, and/or a decorative layer, may also be included in order to produce or vary decorative, and/or other effects. The structurally reinforced multilayer is made from a thermoplastic resin system and at least one fabric layer containing reinforcing fibers. Reinforcing fibers are introduced into components of the structurally reinforced multilayer, within the fabric layers, and may also be comingled with or layered into the thermoplastic resin system before addition to the fabric.

12 Claims, 2 Drawing Sheets

STRUCTURALLY REINFORCED THERMOPLASTIC-FABRIC COMPOSITE CONSTRUCTION MATERIALS THAT ARE MOLDABLE

BACKGROUND OF THE INVENTION

The present invention relates to novel binded materials.

The present invention also relates to novel binded fabrics and thermoplastic materials, and to the methods of constructing and binding them.

The present invention further relates to novel binded and structurally reinforced thermoplastic-fabric composite construction materials, which may be decorative or nondecorative, and are readily moldable.

The problem of mating rigid and semi-rigid structural and decorative textile components, such that products capable of being further machine processed result, spans several different technical fields. Essentially, production of structurally sound textiles comprising fibers, yarns and fabrics with appropriate finishes for further molding has been a long standing problem. As such, attempts have been made in which layers of fibers have been combined with an assortment of other structural elements to form the needed composite construction material. For example, the manufacture of composite construction materials comprising reinforcing fibers of filament enclosed in matrices of thermosetting polymers suffer from storage problems because of their finite shelf lives. Thermosetting polymers also harden permanently once heated, precluding further molding of the composite construction materials produced therefrom.

In contrast, thermoplastic resin systems do not have storage problems, since they have high molecular weights and are additionally thermoformable, so that they can be worked many times after their initial molding at temperature.

However, there are difficulties in producing a composite construction material which comprises reinforcing fibers within a matrix of thermoplastic resin. One route of manufacture entails impregnating the reinforcing fibers with a solution of the thermoplastic resin system in a suitable solvent. The solvent is evaporated, and molding is performed to provide the resulting composite construction material. Composite construction materials manufactured by such a method suffer from several major disadvantages. For instance, it is very difficult to completely evaporate the solvent. Some trapping of solvent may occur, resulting in a somewhat porous composite construction material. Porosity reduces strength and may lead to accelerated thermal degradation at elevated temperatures. Another disadvantage is that it is not usually possible to accurately monitor the amount of thermoplastic resin system impregnated into the filaments. Some usually runs off of the filaments resulting in a final thermoplastic resin system content less than anticipated.

An additional disadvantage of known products of the manufacture of composite construction materials has been well documented. When composite construction materials comprising layers of fabric are reinforced with thermoplastic resin system, much dead, or inert, space is often created within the composite. These spaces reduce the value of the composite material produced. These problems are often a function of the methods utilized to bind together component parts of the composite construction material.

In order to overcome the difficulty involved in joining layers of fabric and the necessary thermoplastic reinforcement layers, a systematic combination of fabric layers, thermoplastic resin system, and other needed layers, is required, such that the components of resulting composite construction materials are readily joinable. In so doing, the methods used to bind these composite construction materials, must not adversely effect the properties sought in their creation.

Various materials have previously been used as liners for automotive interiors, but there is an increasing demand for liner materials which can be further machined, preformed, molded, and readily installed, which already have appropriate decorative, structural and molding properties.

While the manufacture of internal furnishing materials for vehicles, houses and the like can be accomplished by subjecting a sheet of plastic to heat and forming solid structures having various curved surfaces, the formed construction material of a plastic sheet alone, has defects such as a flat appearance and a cold and hard feel. To remedy this defect, methods of binding pieces of cloth onto the surfaces of the plastic sheets alone have been adopted. However, due to the insufficiencies in textural stretching of the cloth or in elongation of the fiber or the yarn which constitutes the cloth, it is necessary to cut and sew the cloth according to the pattern beforehand, and then bind the cloth and the plastic sheet together, in order to bind the cloth sufficiently along the resulting curved surface. Not only are these steps disadvantageous in the process, but also the appearance of the finished composite construction material formed has low commercial value.

In order to improve appearance and structure, attempts have been made to bind the cloth and the plastic sheet, and then produce integrated formed products. However, such processes have problems in requiring excessive pressure and temperature for forming, which causes deformation to the resulting composite construction material. These defects result from the large deformation stress and the small thermoplastic property of the cloth under the forming conditions. When heat is exerted at a sufficient temperature to enable the cloth to be subjected to heat forming, the cloth is molded under pressure, and changes its fiber form and recovering property. This results in extreme alteration of appearance and structure, and low decorative or finished value.

Alternate methods of composite construction material manufacture, often generate as many operating constraints as they eliminate, and the prior art is replete with attempts to acquire specific properties in thermoplastic composite construction materials, through creative manipulation and substitution of their component materials. When both structural and decorative properties are sought, it is often appropriate to employ methods of plastics fabrication in combination with mechanical alterations. Intermediate plastic forms have been efficiently used for these purposes.

The present invention is designed to provide binded and structurally reinforced thermoplastic-fabric composite construction materials, that are moldable. They may be produced in a one-pass process using binding means, and may have decorative or other nondecorative elements, as well.

The materials produced by the present invention, overcome the problems in conventional practice, by disposing a series of fabric layers containing structural reinforcement fibers, about a thermoplastic resin system, introduced as powder, film, or yarn, which is combined by binding means employing stitch yarns, which will not melt during heating and molding.

The resulting binded and structurally reinforced thermoplastic-fabric composite construction materials, that are moldable, demonstrate a structural uniformity and homogeneity, heretofore undisclosed in the art. This material is then suitable for further ready molding, and/or pre-forming, to yield a structurally reinforced thermoplastic-fabric composite construction material product. This product is then further moldable, even in its decorative form. An alternate preferred embodiment of the present invention employs stitch yarns which melt, or transform, during molding to create, a finished product having enhanced decorative appeal.

SUMMARY OF THE INVENTION

An objective of the present invention is to provide binded and structurally reinforced thermoplastic-fabric composite construction materials, that are moldable, yielding structural and decorative values and properties appropriate to the creation of a composite decorative reinforced fabric product, with the utilization of binding means for the attachment of the component composite layers.

Another objective of the present invention, is to provide a binded and structurally reinforced thermoplastic-fabric composite construction material, with little or no decorative elements, where the desired properties can be generated through the use of a barrier fabric layer, or without the use of additional layers.

A further objective of the present invention, is to provide a binded and structurally reinforced thermoplastic-fabric composite construction material, with an incorporated final decorative fabric layer, allowing the finished molded structural composite product to require no painting or other surface finishings.

Still another objective of the present invention, is to provide a binded and structurally reinforced thermoplastic-fabric composite construction material, employing stitch yarns which melt during molding, to create a finished product with enhanced decorative appeal.

These and still further objectives of the present invention, will become apparent hereinafter.

Binded and structurally reinforced thermoplastic-fabric composite construction materials, that are moldable are described, comprising a structurally reinforced multilayer component, made from a thermoplastic resin system incorporating reinforcing fibers, introduced into the structurally reinforced multilayer by means of a fabric layer. Additionally, reinforcing fibers may also be present within the thermoplastic resin system itself. The structurally reinforced multilayer, and any additional layers, such as a barrier fabric layer and/or a decorative layer, are binded together in a binding process.

Additionally, a method is described for making the binded and structurally reinforced thermoplastic-fabric composite construction materials, that are moldable, by binding the structurally reinforced multilayer together with any associated layers, utilizing conventional stitching, knitting, sewing, and ultrasonic binding, or the like binding techniques.

The binded and structurally reinforced thermoplastic-fabric composite construction material, that is moldable, is produced in roll form suitable for preforming and/or molding.

The binded and structurally reinforced thermoplastic-fiber composite construction materials, that are moldable, of the present invention have utility in the manufacture of automotive door panels, stackable furniture items, or other industrial applications, contingent upon the mating together of rigid and semi-rigid structural parts and panels and/or decorative panels and parts.

In summary, and in accordance with the above discussion, the foregoing objectives are achieved in the following embodiments.

1. A binded and structurally reinforced thermoplastic-fabric composite construction material that is moldable, comprising a structurally reinforced multilayer, said structurally reinforced multilayer, further comprising at least one thermoplastic resin system layer, and at least one fabric layer containing reinforcing fibers.

2. A binded and structurally reinforced thermoplastic-fabric composite construction material, as described in paragraph 1, wherein said structurally reinforced multilayer, further comprises a plurality of fabric layers.

3. A binded and structurally-reinforced thermoplastic fabric composite construction material, as described in paragraph 1, wherein said thermoplastic resin system layer, further comprises reinforcing fibers, selected from the group consisting of textile and nontextile yarn, filament strands and monofilaments.

4. A binded and structurally reinforced thermoplastic-fabric composite construction material, as described in paragraph 1, wherein said fabric layer, further comprises reinforcing fibers selected from the group consisting of glass, graphite, kevlar, textile, chopped strand mat and continuous strand mat.

5. A binded and structurally reinforced thermoplastic-fabric composite construction material, as described in paragraph 1, wherein said structurally reinforced thermoplastic-fabric composite construction material is stitch-binded.

6. A structurally reinforced thermoplastic-fabric composite construction material, as described in paragraph 1, wherein said structurally reinforced thermoplastic-fabric composite construction material is not binded.

7. A binded and structurally reinforced thermoplastic-fabric composite construction material, as described in paragraph 5, wherein the stitch-binding means are selected from the group consisting of knitting, sewing, and stitching.

8. A binded and structurally reinforced thermoplastic-fabric composite construction material, as described in paragraph 4, wherein said fabric layer further comprises said reinforcing fibers arranged in any desired orientation.

9. A binded and structurally reinforced thermoplastic-fabric composite construction material, as described in paragraph 2, wherein said plurality of fabric layers, further comprise at least one reinforcing fiber selected from the group consisting of glass, graphite, and kevlar, or the like fiber.

10. A binded and structurally reinforced thermoplastic-fabric composite construction material, as described in paragraph 2, wherein said plurality of fabric layers further comprising said reinforcing fibers.

11. A method to construct a binded and structurally reinforced thermoplastic-fabric composite construction material, that is moldable, which comprises introducing a thermoplastic resin system to at least one fabric layer, which contains reinforcing fibers, to form a structurally reinforced multilayer, and binding together said structurally reinforced multilayer with stitch yarn on at least one stitch-binding means, selected from the group consisting of stitching, knitting, and sewing means.

12. A method to construct a binded and structurally reinforced thermoplastic-fabric composite construction material, as described in paragraph 11, which further comprises introducing a barrier fabric layer adjacent to said structurally reinforced multilayer, and binding said barrier fabric layer with said structurally reinforced multilayer.

13. A method to construct a binded and structurally reinforced thermoplastic-fabric composite construction material, as described in paragraph 11, which further comprises introducing at least one barrier fabric adjacent to said structurally reinforced multilayer, introducing a decorative layer adjacent to said barrier fabric layer, such that said barrier fabric layer is positioned between said structurally reinforced multilayer and said decorative layer, and binding together said decorative layer, said barrier fabric layer and said structurally reinforced multilayer.

14. A method to construct a binded and structurally reinforced thermoplastic-fabric composite construction material, as described in paragraph 11, which further comprises introducing at least one decorative layer adjacent to said structurally reinforced multilayer, and binding together said decorative layer and said structurally reinforced multilayer.

15. A method to construct a binded and structurally reinforced thermoplastic-fabric composite construction material, as described in paragraph 11, which further comprises heating said structurally reinforced multilayer in order to bond said layers of said structurally reinforced multilayer, prior to binding said structurally reinforced multilayer with said stitch yarn.

16. A method to construct a binded and structurally reinforced thermoplastic-fabric composite construction material, as described in paragraph 11, wherein said stitch yarn, further comprises a fiber having a sufficiently higher melting point, than that of the thermoplastic resin system, in order to prevent said stitch yarn from melting during the molding process and applying heat to said thermoplastic-fabric composite.

17. A method to construct a binded and structurally reinforced thermoplastic-fabric composite construction material, as described in paragraph 11, wherein said stitch yarn further comprises a textile fiber selected from the group consisting of kevlar, nylon, glass and polyester.

18. A method to construct a binded and structurally reinforced thermoplastic-fabric composite construction material, as described in paragraph 11, which further comprises introducing said thermoplastic resin system in a powder form, to at least one fabric layer, and heating said thermoplastic resin system for attachment to said reinforcing fibers of said structurally reinforced multilayer, prior to said binding with said stitch yarn.

19. A method to construct a binded and structurally reinforced thermoplastic-fabric composite construction material, as described in paragraph 11, wherein said thermoplastic resin system, introduced into said structurally reinforced multilayer, is at least one form, selected from a group consisting of powder, film, nonwoven fabrics, fibers, yarn, filament and monofilament.

20. A method to construct a binded and structurally reinforced thermoplastic-fabric composite construction material, as described in paragraph 11, wherein said thermoplastic resin system that is introduced into said structurally reinforced multilayer, further comprises at least one form of reinforcing fiber selected from the group consisting of yarn, filament strands and monofilaments, wherein said thermoplastic resin system being layered with said reinforcing fibers.

21. A method to construct a binded and structurally reinforced thermoplastic-fabric composite construction material, as described in paragraph 11, wherein said thermoplastic resin system that is introduced into said structurally reinforced multilayer, further comprises at least one form of reinforcing fiber selected from the group consisting of yarn, filament strands and monofilaments, wherein said thermoplastic resin system being comingled with reinforcing fiber strands.

22. A method to construct a binded and structurally reinforced thermoplastic-fabric composite construction material, as described in paragraph 11, wherein said thermoplastic resin system is introduced in the form of a plurality of thermoplastic resin system layers.

23. A method to construct a binded and structurally reinforced thermoplastic-fabric composite construction material, as described in paragraph 11, wherein said decorative layer and said structurally reinforced multilayer are impregnated with said thermoplastic resin system.

24. A product, as produced by the method described in paragraph 11, comprising a binded and structurally reinforced thermoplastic-fabric composite construction material that is moldable.

25. A product, as produced by the method described in paragraph 12, comprising a binded and structurally reinforced thermoplastic-fabric composite construction material that is moldable.

26. A product, as produced by the method described in paragraph 13, comprising a binded and structurally reinforced thermoplastic-fabric composite construction material that is moldable.

27. A product, as produced by the method described in paragraph 14, comprising a binded and structurally reinforced thermoplastic-fabric composite construction material that is moldable.

28. A method to construct a binded and structurally reinforced thermoplastic-fabric composite construction material, that is moldable, as described in paragraph 11, further comprising, wherein prior to binding, a barrier fabric layer is introduced from a roll; said barrier fabric layer being in the form of at least one selected from the group consisting of film, nonwoven cloth, and flexible cloth; said barrier fabric layer density being sufficient to prevent melted thermoplastic resin liquids from migrating through, yet of a nature that would allow stitching needles or the like mechanical binding means to pierce through and bind said barrier fabric layer to said reinforcing multilayer beneath; said barrier fabric layer being insoluble in the thermoplastic resin system utilized; and said barrier fabric layer remaining substantially unchanged.

29. A method to construct a binded and structurally reinforced thermoplastic-fabric composite construction material that is moldable, as described in paragraph 12, wherein prior to binding, a barrier fabric layer is introduced from a roll; said barrier fabric layer being in the form of at least one selected from a group consisting of film, nonwoven cloth, woven cloth and flexible cloth;

said barrier fabric layer being dense enough to prevent melted thermoplastic resins liquids from migrating through, yet of a nature that would allow stitching needles or other mechanical binding means, to pierce through and bind said barrier fabric layer to the reinforcing multilayer beneath; said barrier fabric layer being insoluble in the thermoplastic resin system utilized; said barrier fabric layer having a melting point sufficiently above the melting point of the thermoplastic resin system, such that when the resultant product is heated, liquifying said thermoplastic resin system, said barrier fabric layer remains substantially entirely unchanged.

30. A method to construct a binded and structurally reinforced thermoplastic-fabric composite construction material, as described in paragraph 12, wherein the stitch yarn melts, and allows for a controlled amount of resin to penetrate through said barrier fabric layer, sufficient to adhere said decorative layer to said barrier fabric layer and the structurally reinforced multilayer adjacent to the barrier fabric layer once molding is completed.

31. A method to construct a binded and structurally reinforced thermoplastic-fabric composite construction material, as described in paragraph 12, wherein said decorative layer comprising a desired fabric is introduced, said decorative layer being pierceable with stitching needles or other mechanical binding means, which will allow a stitching machine or other binding means to bind said layers, said decorative layer having a melting point sufficiently above the melting point of said thermoplastic resin system.

32. A method to construct a binded and structurally reinforced thermoplastic-fabric composite construction material, as described in paragraph 13, wherein said decorative layer comprising a desired fabric is introduced, said decorative layer being pierceable with stitching needles or other mechanical binding means, which will allow a stitching machine, or other binding means, to bind said layers, said decorative layer having a melting point sufficiently above the melting point of said thermoplastic resin system utilized.

33. A method of producing molded products from the binded and structurally reinforced thermoplastic-fabric composite construction materials, as described in para. 24, further comprising cutting a pattern of said construction materials, exposing said pattern of construction material to a thermoforming process, wherein the binded and structurally reinforced thermoplastic-fabric composite construction material is heated to a level wherein said thermoplastic resin system will melt and contact said reinforcing fiber as the thermoplastic resin system is simultaneously dimensionally shaped, cooling and mold separating, whereupon the resin hardens, whereby the binded and structurally reinforced thermoplastic-fabric composite construction material becomes rigid, and is then removed from the mold.

34. A method of producing molded products from the binded and structurally reinforced thermoplastic-fabric composite construction materials, as described in para. 25, further comprising cutting a pattern of said construction materials, exposing said pattern of construction material to a thermoforming process, wherein the binded and structurally reinforced thermoplastic-fabric composite construction material is heated to a level wherein said thermoplastic resin system will melt and contact said reinforcing fiber as the thermoplastic resin system is simultaneously dimensionally shaped, cooling and mold separating, whereupon the resin hardens, whereby the binded and structurally reinforced thermoplastic-fabric composite construction material becomes rigid, and is then removed from the mold.

35. A method of producing molded products from the binded and structurally reinforced thermoplastic-fabric composite construction materials, as described in para. 26, further comprising cutting a pattern of said construction materials, exposing said pattern of construction material to a thermoforming process, wherein the binded and structurally reinforced thermoplastic-fabric composite construction material is heated to a level wherein said thermoplastic resin system will melt and contact said reinforcing fiber as the thermoplastic resin system is simultaneously dimensionally shaped cooling and mold separating, whereupon the resin hardens, whereby the binded and structurally reinforced thermoplastic-fabric composite construction material becomes rigid, and is then removed from the mold.

36. A method of producing molded products from the binded and structurally reinforced thermoplastic-fabric composite construction materials, as described in para. 27, further comprising cutting a pattern of said construction materials exposing said pattern of construction material to a thermoforming process, wherein the binded and structurally reinforced thermoplastic-fabric composite construction material is heated to a level wherein said thermoplastic resin system will melt and contact said reinforcing fiber as the thermoplastic resin system is simultaneously dimensionally shaped, cooling and mold separating, whereupon the resin hardens, whereby the binded and structurally reinforced thermoplastic-fabric composite construction material becomes rigid, and is then removed from the mold.

37. A binded and structurally reinforced thermoplastic-fabric composite construction material, suitable as a remoldable decorative product, comprising a structurally reinforced multilayer; said structurally reinforced multilayer further comprising fabric layers, a thermoplastic resin system, a barrier fabric layer and a decorative layer, said thermoplastic resin system, comprising a thermoplastic resin system layer, said fabric layers further comprising reinforcing fibers, and said binded and structurally reinforced thermoplastic-fabric composite construction material being stitch-binded.

38. A method to construct a binded and structurally reinforced thermoplastic-fabric composite construction material, suitable for constructing remoldable decorative products, comprising forming a structurally reinforced multilayer, by introducing a thermoplastic resin system into fabric layers, said fabric layers further comprising reinforcing fibers, placing a barrier fabric layer adjacent to said structurally reinforced multilayer, placing a decorative layer adjacent to said barrier fabric layer.

BRIEF DESCRIPTION OF THE DRAWINGS

In order that the present invention may be more fully and readily understood, and, further, that all the features thereof may be better appreciated, the present invention will now be described by way of preferred examples, with reference to the accompanying drawings.

DESCRIPTION OF THE PREFERRED EMBODIMENTS OF THE PRESENT INVENTION

Figure 1:
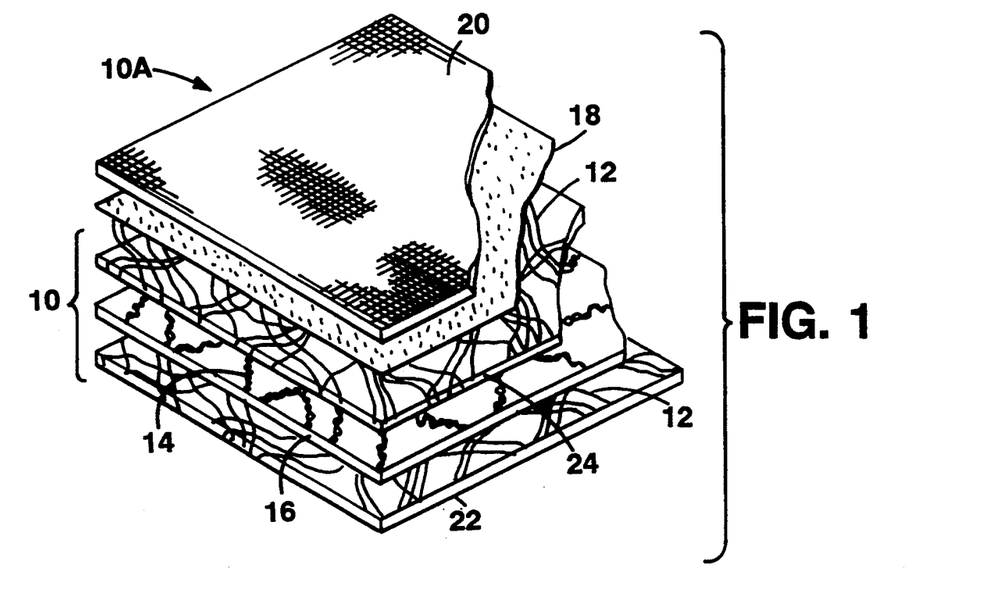
FIG. 1 is an elevated perspective view of a section of the components of a preferred embodiment of the structurally reinforced thermoplastic-fabric composite construction material, that is moldable, of the present invention, prior to binding.

FIG. 1, is an elevated perspective view of a section of the components of a preferred embodiment of the structurally reinforced thermoplastic-fabric composite construction material, that is moldable, of the present invention, prior to binding. The structurally reinforced thermoplastic-fabric composite construction material, that is moldable, prior to binding, is depicted here generally as 10A. The structurally reinforced multilayer 10, comprises single or multiple fabric layers containing reinforcing fibers, and a thermoplastic resin system. The thermoplastic resin system is not numbered in any figure depicted herein, since it is the starting material, introduced to eventually comprise the thermoplastic resin system layer 16. In the preferred embodiment of FIG. 1, the structurally reinforced multilayer 10 is illustrated as having fabric layers 22 and 24, respectively, below and above the thermoplastic resin system layer 16. These fabric layers 22 and 24, are constructed on a textile machine, with fiber orientations which may range from unidirectional single layer fiber orientations, to unidirectional multiple-layered fiber orientations, to combinations of fibers and fiber orientations, in any conceivable angle.

Fabric layers 22 and 24, shown below and above the thermoplastic resin system layer 16, are further comprised of reinforcing fibers 12. Reinforcing fibers 12 may consist of textile, and/or nontextile fibers. Such nontextile, and/or textile, reinforcing fibers of high strength, such as glass, graphite, kevlar, or the like, may be employed. The orientations of these nontextile reinforcing fibers 12, may range from unidirectional single layer fiber orientations, to unidirectional multiple-layered fiber orientations, to combinations of fibers and fiber orientations, in any conceivable angle.

Textile reinforcing fibers 12, are typically, glass, nylon, polyester, graphite, cotton, wool, rayon, or the like. These textile reinforcing fibers 12, may be in the form of either random or oriented fiber distribution, or continuous mat. Fabric layers 22 and 24, may also be of hybrid reinforcing fiber 12 construction, with fiber blends in any orientation, layer, or angle, to optimize material and product properties. Also, textile and nontextile reinforcing fibers 12, may be combined in any fabric layer, or layers 22 or 24, in any of the above fiber orientations.

Prior to binding the aforementioned structurally reinforced multilayer 10, a thermoplastic resin system is introduced, which ultimately becomes the thermoplastic resin system layer 16, which becomes part of the structurally reinforced multilayer 10 along with the adjacent bottom and top fabric layers 22 and 24, respectively. The thermoplastic resin system may be introduced to the structurally reinforced multilayer 10, in powder form, which may then be heated for attachment to the reinforcing fibers 12, of the fabric layers 22 and 24, thereby providing structural reinforcement. The thermoplastic resin system, may also be introduced as a thermoplastic film layer 16, being fed to become part of the structurally reinforced multilayer 10, from roll goods.

The thermoplastic resin system, that is introduced to the fabric layers 22 and 24, may include reinforcing fibers 14, such that the thermoplastic resin system layer 16 will contain textile or nontextile reinforcing fibers 14. The thermoplastic resin system may be introduced with strands of reinforcing fiber 14, of a fibrous nonwoven construction, or with strands of reinforcing fiber 14, such as yarn, filaments, straws or monofilaments, such that the thermoplastic resin system is layered with the reinforcing fiber 14 strands. Alternatively, the thermoplastic resin system may be comingled with the reinforcing fibers 14, by plying or twisting, or non-plying or non-twisting, the reinforcing fibers 14, with the thermoplastic resin system, or by comingling the reinforcing fibers 14 prior to the yarn, strand, roving, or the like, construction.

In the preferred embodiment as depicted in FIG. 1, the structurally reinforced multilayer 10, with the thermoplastic resin system layer 16, disposed adjacent to, and between the fabric layers 22 and 24, is bordered on the top by an adjacent barrier fabric layer 18. This barrier fabric layer 18, is designed to confine the thermoplastic resin system, which may otherwise seep through the adjacent fabric layer 24, to the decorative layer 20, during heating and molding. This barrier fabric layer 18, may be introduced from a roll in the form of a film, a nonwoven, or any flexible fabric barrier, dense enough to prevent liquid thermoplastic resins from migrating through, yet of a nature that would allow stitching needles, or other mechanical binding means to pierce through and bind the barrier fabric layer 18, to the structurally reinforced multilayer 10 beneath.

Being adjacent to the top-most fabric layer 24, as well as situated above the thermoplastic resin layer 16, the barrier fabric layer .18, also serves as a barrier, or retainer, between the reinforcing fibers 12 of the fabric layer 24, and the final or outer-most surface decorative layer 20.

The chemistry of the barrier fabric layer 18, should also be such that it is not soluble in the thermoplastic resin system. It should furthermore have a melting point sufficiently above the melting point of the thermoplastic resin system. This is required, so that when the material or product, is heated to liquify the thermoplastic resin system, the barrier fabric layer 18, will remain substantially unaffected.

The decorative layer 20, serves as the final or outer layer of the structurally reinforced thermoplastic-fabric composite construction material 10A, that is moldable, of the present invention, and may be comprised of woven or nonwoven fabric as desired, to enhance the appearance of the final material or product. The decorative layer 20, may also be situated on both sides of the structurally reinforced multilayer 10, in order to achieve a two-sided decorative reinforced composite material. The preferred embodiment of the present invention will be pierceable with conventional stitching needles or other mechanical binding means, as well as to allow the stitching machine or other binding means to combine or bind all component layers described.

It should be noted that the term "binding," as used throughout, is generally interchangeable with the term "bonding." Generally, the term "binding" is used when referring to attachment by mechanical means, such as stitching materials or layers together, etc. The term "binding," is herein used to distinguish from the meaning of the term "bonding," which generally includes attachment by a chemical process.

The preferred embodiment of decorative layer 20, usually employs a needle felt, or the like, due to the ease of stitching and the abrasive properties associated therewith. For example, the decorative layer 20, could be in the form of a printed nonwoven fabric with a camouflage design, allowing the finished molded, binded and structurally reinforced thermoplastic-fabric composite construction material, to require neither painting nor further surface finishing. Further examples involve use of a woven or embossed cloth for the decorative layer 20, which yields a material having a textured surface. The decorative layer 20, when incorporated, must have melting properties suitably higher than that of the thermoplastic resin system, used to form the structurally reinforced multilayer 10.

Figure 2:
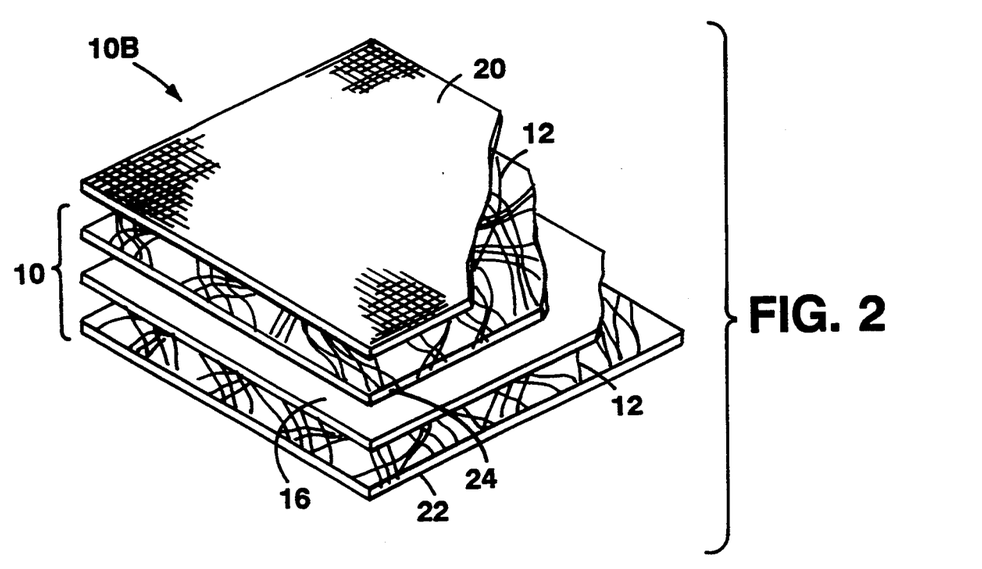
FIG. 2 is an elevated perspective view of a section of the components of an alternate preferred embodiment of the structurally reinforced thermoplastic-fabric composite construction material, that is moldable, of the present invention, prior to binding.

FIG. 2, is an elevated perspective view of a section of the components of an alternate preferred embodiment of the structurally reinforced thermoplastic-fabric composite construction material, that is moldable, of the present invention, prior to binding. This structurally reinforced thermoplastic-fabric composite construction material, prior to binding, is depicted here generally as 10B. This alternate preferred embodiment, has all of the same components as in the preferred embodiment shown in FIG. 1, with the exception that the barrier fabric layer 18 is omitted, and the thermoplastic resin system layer 16, does not therein contain reinforcing fibers 14.

In this alternate preferred embodiment, i.e. 10B, the barrier fabric layer 18, is eliminated and, the decorative layer 20, is introduced immediately adjacent to the fabric layer 24, of the structurally reinforced multilayer 10. During the molding process, this decorative layer 20, is impregnated with the thermoplastic resin system, of the structurally reinforced multilayer 10.

Figure 3:
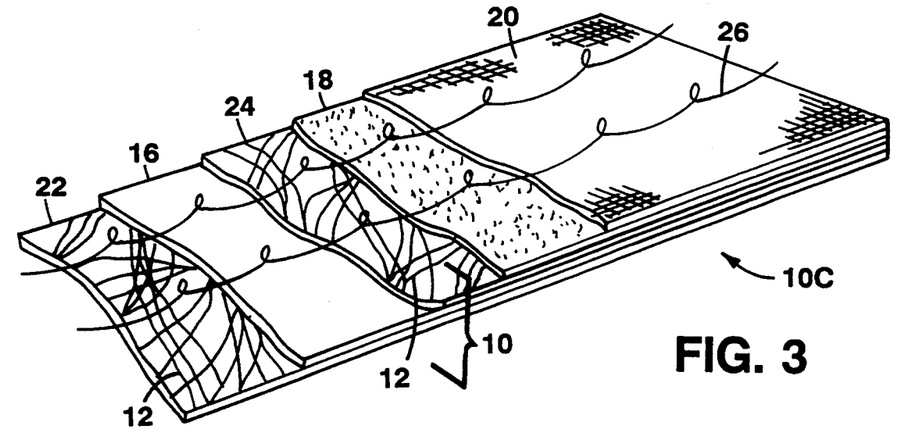
FIG. 3 is a perspective view of a section of the components of the preferred embodiment, of a binded and structurally reinforced thermoplastic-fabric composite construction material, that is moldable, of the present invention, as shown in FIG. 1, with all of the components binded with stitch yarn.

FIG. 3, is a perspective view of a section of the components of the preferred embodiment, of a binded and structurally reinforced thermoplastic-fabric composite construction material, that is moldable, of the present invention, as shown in FIG. 1, except, not showing reinforcing fibers 14, and with all of the components binded with stitch yarn. This binded and structurally reinforced thermoplastic-fabric composite construction material, that is moldable, is depicted in FIG. 3 generally as 10C. The binded and structurally reinforced thermoplastic-fabric composite construction material, that is moldable, i.e. 10C, is herein illustrated in binded form, wherein all layers, i.e. 12, 16, 24, 18 and 20, are binded together with stitch yarn 26. The barrier fabric layer 18, as above described, serves as a barrier to prevent thermoplastic resin system impregnation of the decorative layer 20.

After all component layers of the structurally reinforced thermoplastic-fabric composite construction material, that is moldable, i.e. here seen as 10C, are arranged as desired, the component layers are attached together via traditional stitching, knitting, sewing, ultrasonic binding, or the like, binding means, along the stitching area. All of the component layers are binded together with a stitch yarn 26 made from a fiber having sufficiently higher melting point or temperature resistance, than that of the thermoplastic resin system, in order to prevent the stitch yarn 26, from melting during the heating or molding process. This stitch yarn 26, could be of fibers, such as textile, or nontextile fibers. This binded and structurally reinforced thermoplastic-fabric composite construction material, that is moldable, i.e., 10C, is now ready for pattern cutting in order to ready it for the heating in the molding process.

A cut pattern can be placed in a thermoforming process, whereupon the temperature is elevated to a level where the thermoplastic resin system, in either fibrous film, powder or nonwoven form, will melt and wet the reinforcing fibers 12, of fabric layers 22 and 24, at the same time as it is dimensionally shaped, to the shape of the finished binded and structurally reinforced thermoplastic-fabric composite construction material, that is moldable, i.e., 10C. The temperature can then be reduced, whereupon free thermoplastic resin will harden and the finished product will turn rigid. The product can then be removed from the mold. The molded, binded structurally reinforced thermoplastic-fabric composite construction material 10C, is also capable of being remolded.

Figure 4:
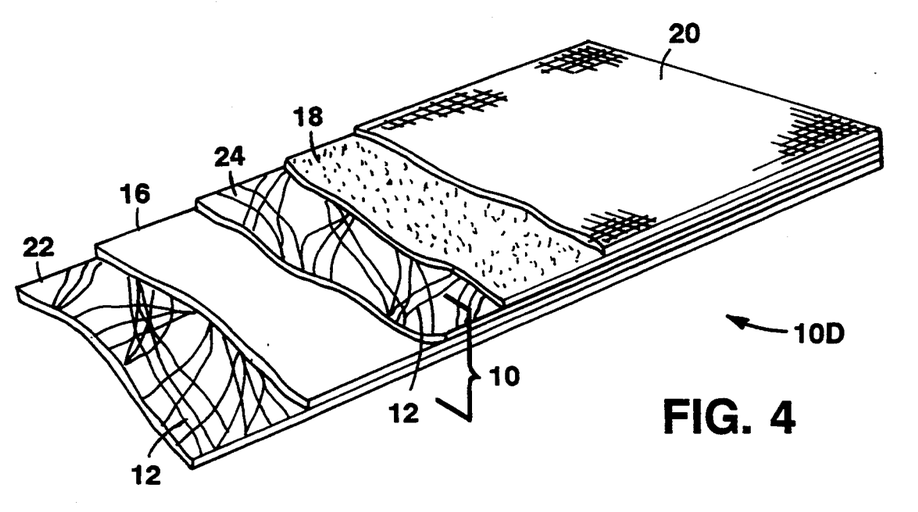
FIG. 4 is a perspective view of a section of the components of the preferred embodiment, of a binded and structurally reinforced thermoplastic-fabric composite construction material, that is moldable, of the present invention, as shown in FIG. 1, wherein all of the components are binded, with the stitch yarn dissolved or melted.

FIG. 4, is a perspective view of a section of the components of the preferred embodiment, of a binded and structurally reinforced thermoplastic-fabric composite construction material, that is moldable, of the present invention, as shown in FIG. 1, wherein all of the components are binded, with the stitch yarn 26 dissolved or melted. This binded and structurally reinforced thermoplastic-fabric composite construction material, that is moldable, is depicted here generally as 10D. In this embodiment, the decorative layer 20, the barrier fabric layer 18, and the structurally reinforced multilayer 10, are binded together by conventional stitching, knitting, sewing, ultrasonic binding, or the like, binding techniques. However, here the stitch yarn 26, has been dissolved or melted in the molding process, in order to prevent it from detracting from the desired appearance of the finished material, and resulting product, and the stitch yarn 26, is, therefore, not visible in FIG. 4.

The barrier fabric layer 18 may also serve to prevent the thermoplastic resin system from seeping into the decorative layer 20. Alternatively, melting of the stitch yarn 22, may also allow a controlled amount of the thermoplastic resin system to penetrate through barrier fabric layer 18, sufficient to adhere the decorative layer 20, to the barrier fabric layer 20, and the structurally reinforced multilayer 10, upon heating.

This binded and structurally reinforced thermoplastic-fabric composite construction material, that is moldable, i.e., 10D, may be cut and molded as above mentioned.

Additionally, it should be noted that although all embodiments described herein are binded, it is also envisioned that certain embodiments, that are not binded, may also be constructed by methods of the present invention.

The previous detailed description of the preferred embodiments of the present invention is presented for purposes of clarity of understanding only, and no unnecessary limitations should be understood or implied therefrom, as all appropriate mechanical and functional equivalents to the above, which may be obvious to those skilled in the arts pertaining thereto, are considered to be encompassed within the claims of the present invention.

What is claimed is:

1. A unitary thermoplastic-fabric flexible web, adapted to be molded under heat and pressure to form an internally reinforced molded article; said web comprising at least on thermo-plastic resin layer (16), at least one woven fabric layer (22) containing reinforcing fibers, and stitching (26) extending completely through all of said layers, whereby said layers are bound together to form a flexible web that can be handled as a unit.

2. A unitary thermoplastic-fabric flexible web, as described in claim 1, wherein said web has a length dimension and a width dimension; said stitching comprising multiple rows of stitches, extending parallel to said length dimension of said web.

3. A unitary thermoplastic-fabric flexible web, as described in claim 1, wherein said web has a length dimension substantially greater than a transverse width dimension, whereby said web can be wound on a transverse axis into a roll configuration; said wound web being adapted to be unwound for cutting into pattern shapes, suitable for individual placement in a mold cavity.

4. A unitary thermoplastic-fabric flexible web, as described in claim 1, wherein there are at least two fabric layers (22); said layers being arranged so that each resin layer is sandwiched between two fabric layers.

5. A unitary thermoplastic-fabric flexible web, as described in claim 1, and further comprising a decorative layer (20), laminated with said fabric and resin layers, so that said decorative layer forms one face of the flexible web; said stitching extending completely through all of said layers, including said decorative layer.

6. A unitary thermoplastic-fabric flexible web, as described in claim 5, and further comprising a relatively non-porous barrier layer (18), located between said decorative layer and one of the fabric layers, to prevent migration of the resin beyond said one fabric layer.

7. A unitary thermoplastic-fabric flexible web, as described in claim 1, wherein said stitching comprises a stitching material that has approximately the same melting point as said resin layer, whereby the stitching layer melts during the molding operation.

8. A unitary thermoplastic-fabric flexible web, as described in claim 7, wherein said stitching material is the same material as said resin layer.

9. A unitary thermoplastic-fabric flexible web, as described in claim 1, wherein there are two fabric layers (22), and one resin layer (16); said layers being arranged so that the single resin layer is sandwiched between said two fabric layers.

10. A unitary thermoplastic-fabric flexible web, as described in claim 1, wherein each resin layer comprises a film of discrete resin particles deposited onto one of said fabric layers.

11. A unitary thermoplastic-fabric flexible web, as described in claim 1, wherein said resin layer comprises a continuous thermoplastic film, having a continuity prior to incorporation into the web.

12. A unitary thermoplastic-fabric flexible web, as described in claim 11, wherein said resin layer has included therein strands of reinforcing fibers.

* * * * *

UNITED STATES PATENT AND TRADEMARK OFFICE
CERTIFICATE OF CORRECTION

PATENT NO. : 5,344,687

DATED : September 6, 1994

INVENTOR(S) : Martin S. Grimnes

It is certified that error appears in the above-identified patent and that said Letters Patent is hereby corrected as shown below:

Col. 10, line 48, ".18" should be --18--.

Col. 13, line 10, "on" should be --one--.

Signed and Sealed this

Thirtieth Day of January, 1996

Attest:

BRUCE LEHMAN

Attesting Officer

Commissioner of Patents and Trademarks